United States Patent [19]
Elazier-Davis et al.

[11] Patent Number: 5,577,463
[45] Date of Patent: Nov. 26, 1996

[54] EXTRUDED SMECTITE CLAY CLUMPING ANIMAL LITTER HAVING IMPROVED CLUMP STRENGTH

[75] Inventors: Carol Elazier-Davis, Oak Park; Gary W. Beall, Island Lake; John Hughes, Long Grove, all of Ill.

[73] Assignee: AMCOL International Corporation, Arlington Heights, Ill.

[21] Appl. No.: 415,665

[22] Filed: Apr. 3, 1995

Related U.S. Application Data

[63] Continuation of Ser. No. 248,304, May 24, 1994, Pat. No. 5,452,684.

[51] Int. Cl.⁶ .................................................. A01K 29/00
[52] U.S. Cl. ........................................................... 119/173
[58] Field of Search .................................... 119/171, 172, 119/173

[56] References Cited

U.S. PATENT DOCUMENTS

| | | | |
|---|---|---|---|
| 2,231,328 | 2/1941 | Simons . | |
| 4,009,684 | 3/1977 | Kliment et al. | 119/1 |
| 4,206,718 | 6/1980 | Brewer | 119/1 |
| 4,315,761 | 2/1982 | Larrson et al. | 71/21 |
| 4,462,470 | 7/1984 | Alexander et al. | 175/72 |
| 4,494,482 | 1/1985 | Arnold | 119/1 |
| 4,506,628 | 3/1985 | Stockel | 119/1 |
| 4,517,919 | 5/1985 | Benjamin et al. | 119/1 |
| 4,534,925 | 8/1985 | Harriett | 264/281 |
| 4,534,926 | 8/1985 | Harriett | 264/281 |
| 4,607,594 | 8/1986 | Thacker | 119/1 |
| 4,657,881 | 4/1987 | Crampton et al. | 502/80 |
| 4,668,724 | 5/1987 | Harriett | 524/108 |
| 4,685,420 | 8/1987 | Stuart | 119/1 |
| 4,686,937 | 8/1987 | Rosenfeld | 119/1 |
| 4,832,793 | 5/1989 | Alexander | 162/181.8 |
| 4,847,226 | 7/1989 | Alexander | 502/83 |
| 4,919,818 | 4/1990 | Alexander | 210/660 |
| 5,014,650 | 5/1991 | Sowle et al. | 119/171 |
| 5,094,189 | 3/1992 | Aylen et al. | 119/173 |
| 5,175,107 | 1/1993 | Buschur | 119/173 |
| 5,267,532 | 12/1993 | Franklin et al. | 119/173 |
| 5,279,259 | 1/1994 | Rice et al. | 119/173 |
| 5,303,675 | 4/1994 | van den Bergh | 119/165 |

FOREIGN PATENT DOCUMENTS

| | | |
|---|---|---|
| 0298143A1 | 11/1989 | European Pat. Off. . |
| 0378421A1 | 7/1990 | European Pat. Off. . |
| 3644826 | 7/1987 | Germany . |
| 60094043 | 5/1985 | Japan . |
| 62239932 | 10/1987 | Japan . |
| 63185323 | 7/1988 | Japan . |
| 63219323 | 9/1988 | Japan . |
| 01085025 | 3/1989 | Japan . |
| WO83/03255 | 9/1983 | WIPO . |
| WO86/00496 | 1/1986 | WIPO . |
| WO91/15291 | 10/1991 | WIPO . |
| WO95/02320 | 1/1995 | WIPO . |

*Primary Examiner*—Thomas Price
*Attorney, Agent, or Firm*—Marshall, O'Toole, Gerstein, Murray & Borun

[57] ABSTRACT

An animal litter including an extruded smectite clay that forms stronger clumps, when wetted with animal urine, due to the extrusion process. In a preferred embodiment, the extruded smectite clay is mixed, before or after extrusion, with a small percentage, preferably at least about 0.025% to less than 0.1%, based on the dry weight of the smectite clay, of a water-soluble adhesive that forms improved, stronger, more cohesive clumps that can be essentially completely removed from a litter box leaving the remaining litter box contents odor-free.

19 Claims, 1 Drawing Sheet

EXTRUDED SMECTITE CLAY CLUMPING ANIMAL LITTER HAVING IMPROVED CLUMP STRENGTH

CROSS REFERENCE TO RELATED APPLICATIONS

This application is a continuation of U.S. application Ser. No. 08/248,304, filed May 24, 1994 now U.S. Pat No. 5,452,684.

FIELD OF THE INVENTION

The present invention is directed to an absorbent smectite clay composition useful as a clumping animal litter wherein during manufacture the smectite clay is sheared in an extruder, to align the clay platelets, resulting in unexpectedly stronger clumps. More particularly, the present invention is directed to a smectite clay-containing cat litter composition formed from powdered or particulate smectite clay particles manufactured by extruding the smectite clay through a die opening, preferably using a shearing wiper blade in alignment with an entrance to the die opening, whereby the shearing of the smectite clay during manufacture provides an unexpected increase in clump strength when the composition is wetted by animal urine. In accordance with the preferred embodiment, an unexpectedly small quantity of a water-soluble adhesive, and water mixed with dried powdered smectite clay followed by extrusion, provides a further increase in clump strength.

BACKGROUND OF THE INVENTION AND PRIOR ART

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added absorbent materials to the litter box or cage to collect the urine and feces. After a relatively short period of time, the dross-soiled absorbent emits objectionable odors because of the presence of the urine and fecal matter.

In order to reduce or eliminate these objectionable odors, homeowners periodically remove the fecal matter from the litter absorbent physically. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time accounts for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials that are used alone or in combination include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, absorbing the liquid dross on its surface. For each absorbent material, offensive odors are eventually caused by the absorbed urine, and the entire contents of the litter box, including soiled absorbent material and unsoiled absorbent material, has to be discarded.

Unicharm KK Japanese application J63044-822-A discloses a clay pet litter containing an organic acid and its salt as a deodorant. The clay litter of the present invention is natural clay, as mined and ground, that is extruded and, with or without an added adhesive, functions to agglomerate liquid animal dross for effective removal of the used liquid-soaked litter without organic acids or deodorant treatment.

Kenkyu Japanese application J6 1119-127-A discloses spraying a cyanoacrylic acid alkyl ester film on the surface of pet feces for removal of the feces separately from the litter.

Crampton et al. U.S. Pat. No. 4,657,881 teaches a pet litter formed from compacted fines of a non-swelling clay, e.g., calcium bentonite clay or other clays such that after compaction, the clay particles have a size of 710 microns to 4 millimeters. The Crampton patent teaches that a small percentage of additive (less than 10% by weight of the compacted particles, preferably less than 5%), such as a water-swellable clay, carboxymethyl cellulose or a soluble polysaccharide increases the absorbency of the litter composition. The Crampton patent does not disclose that the composition forms removable clumps when wetted with animal dross.

Other clumping animal litter compositions are described in this Assignee's U.S. Pat. Nos. 5,000,115 (Reissued as U.S. Pat. No. Re. 33 983); 5,129,365; and in pending U.S. application Ser. No. 07/880,580 filed May 8, 1992. These patents teach that a water-swellable bentonite clay particles, e.g., natural or synthetic sodium bentonite clay particles, will agglomerate with surrounding wetted sodium bentonite particles, when wetted with animal dross, to form a strong, cohesive clump that can be essentially completely removed from a litter box leaving essentially only unsoiled litter particles.

Stuart, in U.S. Pat. No. 4,685,420, discloses an improved litter box absorbent composition comprising from 0.01% to 5.0% by weight of a water-absorbent polymer, e.g., a polyacrylate in combination with a common litter box absorbent material. According to the method and composition of Stuart, the polyacrylate and absorbent material absorb the urine or similar waste material, and the polyacrylate interacts with the soiled litter box absorbent material to form a gelled product. Stuart teaches that the gelled absorbent material or clump then can be physically removed from the litter box to reduce the generation of offensive odors, and to avoid discarding the unsoiled portion of the absorbent material. However, the method and composition of Stuart suffers from the disadvantage of relative cost ineffectiveness. The commonly used litter box absorbent materials are very inexpensive materials, whereas the water-absorbent polymers of Stuart are relatively expensive products that can raise the initial cost of the litter box absorbent material to an unacceptable level in a very cost competitive market.

Others have attempted to provide an animal litter that forms strong, coherent clumps when wetted with animal dross by mixing the absorbent litter material with a dry, particulate water-soluble adhesive that is relatively inexpensive, such as a cellulosic adhesive, wheat paste (a pregelatinized starch), gums and the like. Examples of this expedient for manufacturing an animal litter, wherein the strength of the clump formed depends upon the addition of an adhesive, are the Buschur U.S. Pat. No. 5,176,107 and the Sowle U.S. Pat. No. 5,014,650. While each of these patents teach that clumps are formed with the addition of at least about 0.1% by weight of the water-soluble adhesive, it is clear from the examples disclosed in these patents coherent clumps, that do not suffer significantly from soiled particles spalling off of the clump before or during the clump removal process, are only achieved with the addition of at least about 0.5% by weight of the water-soluble adhesive.

In the cost conscious animal litter market, there has been a long-felt need to provide an animal litter manufactured from one or more very inexpensive components that, when wetted with animal dross, forms a strong, coherent clump, wherein soiled portions of the clump do not fall off of the clump for admixture with the unsoiled particles, in order to provide an animal litter composition that is essentially odor-free for an indefinite time period without completely replacing the contents of an animal litter box.

SUMMARY OF THE INVENTION

The animal litter compositions and methods of the present invention include an extruded smectite clay that forms stronger clumps, when wetted with animal urine, due to the extrusion process. In a preferred embodiment, the extruded smectite clay is mixed with a small percentage, preferably at least about 0.025% to less than 0.1%, based on the dry weight of the smectite clay, of a water-soluble adhesive that forms improved, stronger, more cohesive clumps that can be essentially completely removed from a litter box leaving the remaining litter box contents odor-free. The amount of adhesive, in the preferred embodiment, that is necessary to substantially improve the strength of the clump is far below that required in the prior art compositions disclosed in the Buschur U.S. Pat. No. 5,176,107 or in the Sowle U.S. Pat. No. 5,014,650. This substantial reduction in water-soluble adhesive needed to form a completely removable, strong, coherent clump is achieved, quite unexpectedly, by the process step of extruding the smectite clay through a die opening prior to or after mixing the smectite clay with the water-soluble adhesive and water to rehydrate the smectite clay.

The smectite clay-based animal litter composition of the present invention effectively collects the urine or other dross material of house-broken pets and caged animals; agglomerates when wetted to allow physical removal of the wetted litter box absorbent material from unwetted litter box absorbent material in order to reduce or eliminate dross-based odors and reduces costs associated with animal litter box absorbent materials; will be relatively non-sticky to the animal when wetted by animal dross by virtue of containing no adhesive, or very little adhesive, yet the litter material forms a cohesive mass that can be retained within the litter box as a cohesive, non-muddy mass until removed by the animal's caretaker; and is sufficiently economical for practical use in a highly competitive and cost conscious market.

Surprisingly and unexpectedly, it has been found that one or more extruded clays such as sodium bentonite, calcium bentonite, and/or fuller's earth, preferably a water-swellable sodium bentonite clay, effectively absorb animal dross, and during absorption of the animal dross, agglomerate into an unexpected stronger and more stable, non-sticky mass for physical separation of the liquid dross-soiled portion of the litter box absorbent material from the unused portion of the litter box absorbent material, even after partial drying, e.g., 1 to 24 hours at room temperature, and remains cohesive and non-adherent to the animal even after a 24 hour drying period at room temperature. The extruded smectite clays, with and without an adhesive, effectively reduce or eliminate odors associated with animal dross; reduce costs associated with litter box absorbent material replacement; and are sufficiently economical to compete effectively in a highly competitive and cost conscious industry.

DETAILED DESCRIPTION OF THE PREFERRED EMBODIMENTS

Figure 1:
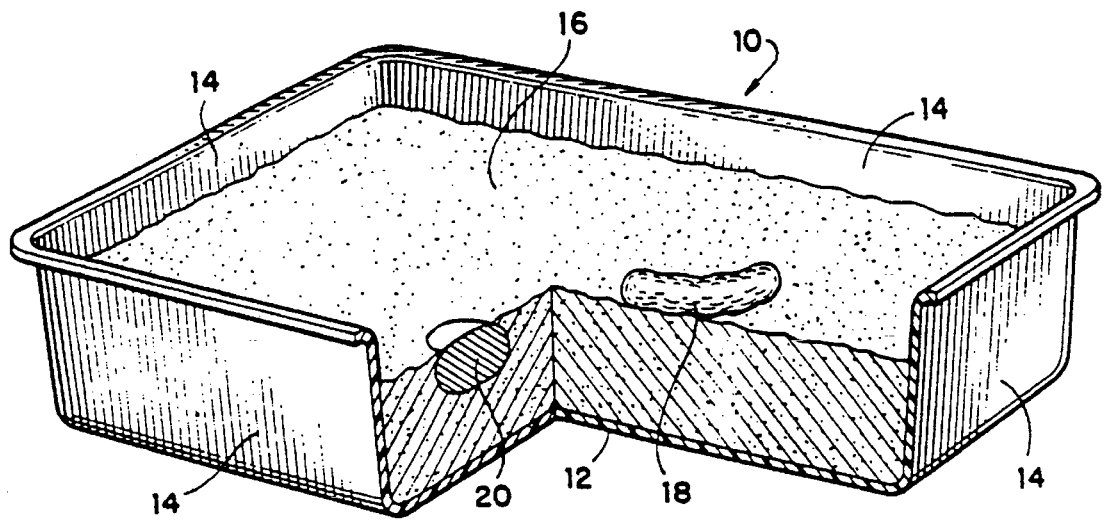
FIG. 1 is a perspective view of a receptacle including the absorbent composition of the present invention.

In accordance with the methods and composition of the present invention, extruded smectite clays have been found to yield unexpectedly stronger clumps when wetted by animal urine, compared to the substantially weaker clumps formed from the same smectite clay that has not been extruded. The extruded smectite clays of the present invention, therefore, provide distinct advantages over prior art animal litter box absorbent compositions in that extruded smectite clay, particularly extruded sodium bentonite, still absorbs several times its weight in liquid dross material, while simultaneously agglomerating with adjacent smectite particles to form a much stronger clump of sufficient size and cohesive strength such that the entire soiled and wetted mass can be essentially completely physically separated from the remaining unwetted smectite clay absorbent material with unexpectedly less spalling or other separation of soiled clay particles from the agglomerate prior to or during physical separation of the soiled clump from the unsoiled litter material.

In accordance with a preferred embodiment, a relatively small percentage of a water-swellable adhesive, e.g., about 0.025% to about 5.0% by weight, preferably less than 0.5%, and more preferably about 0.025% to less than 0.1%, e.g., about 0.025% to about 0.09% based on the dry weight of the smectite clay, and water, are combined with the extruded smectite clay to substantially increase the strength, coherency and stability of the clumps of extruded smectite clay that form when the extruded clay is wetted with animal dross, e.g., animal urine. With and without the adhesive, the extruded, rehydrated smectite clay-based absorbent, clumping litter material serves to reduce or eliminate odors resulting from urine-saturated litter box absorbents; reduces the cost of using a litter box absorbent material, since only soiled absorbent material is discarded; reduces the number of times the litter box or animal cage must be completely cleaned; enables periodic disposal of the formed agglomerates, and the cohesive agglomerates are not sticky on their outer surfaces so that the wetted, extruded smectite clay does not substantially adhere to an animal's paws or fur.

In accordance with an important feature of the present invention, extruded smectite clays, preferably a water-swellable sodium bentonite clay, provides an improved animal litter box absorbent composition. The extruded smectite clays of the present invention absorb aqueous fluids, such as urine, and interact with nearby wetted smectite clay particles to form an unexpectedly strong agglomerate or clump through physical and chemical interactions, such as hydrogen bonding and entanglement. The wetted mass of clay is of sufficient stability and size such that the mass can be removed from the unwetted particles of the smectite clay, even after partial drying at room temperature for periods of about 1 to about 24 hours, as normally would occur before removal of the soiled pet litter material. The cohesive masses formed after wetting the extruded smectite clay particles with liquid animal dross are relatively dry feeling on the outer surfaces so that they do not adhere to animal paws or fur. Unexpectedly, extrusion of the smectite clay substantially increases the strength of the resulting clumps when the extruded clay is wetted by animal urine. The chemical and physical interactions that cause the wetted bentonite clay particles to agglomerate so strongly are not present to nearly the same degree if the smectite clay is not rehydrated and extruded.

In practice, when an animal urinates on the litter box absorbent material of the present invention, the urine is absorbed by the extruded smectite clay, in powder or particulate form, to form an agglomerated mass of clay and urine having a non-sticky, relatively dry feeling surface (non-muddy). This agglomerated mass has unexpectedly better physical integrity due to the clay being sheared during extrusion to align the clay platelets. Extrusion of clay for the purpose of improving properties of the clay as an oil well drilling additive is disclosed in this Assignee's U.S. Pat. No. 4,462,470, hereby incorporated by reference. The resulting clumps are more easily and more completely removed from a litter box, or an animal cage, than prior art litter compositions, by using the implements, e.g., a slotted scoop, and methods normally used to remove feces from a litter box. Therefore, the litter box absorbent composition of the present invention permits the animal owner or caretaker to employ the same removal techniques used to remove feces from the litter box to more completely remove urine from the litter box.

In accordance with an important feature of the present invention, the extruded smectite, e.g., sodium bentonite, clay absorbent remaining in the litter box after removal of the urine-soaked and agglomerated extruded smectite clay still is available for future use. This portion of the litter box absorbent composition is still clean and useful, and does not contribute to the generation of noxious odors.

For example, FIG. 1 of the drawings shows a litter box 10 comprising a water-impermeable floor member 12 having integral, water-impermeable upstanding walls 14. The unsoiled absorbent composition 16, comprising an extruded smectite clay, preferably sodium bentonite, is placed in the litter box 10. In the preferred embodiment, the extruded smectite clay includes about 0.025% to about 5.0%, preferably less than 0.5%, and more preferably about 0.025% to less than 0.1%, based on the dry weight of the smectite clay, of a water-soluble adhesive, in powder or particulate form, homogeneously mixed with the extruded smectite clay. As will become apparent from the data collected on various mixtures of extruded smectite clay and adhesive, the adhesive can be added dry and mixed without the addition of water, or the extruded smectite clay and adhesive can be wetted with a small amount of water during mixing, e.g., about 10% to about 35%, preferably about 10% to about 20% added water, based on the dry weight of the smectite, to partially or completely solubilize the adhesive and thereby coat or partially coat the outer surface of the clay particles with adhesive.

Solid animal dross 18, such as fecal matter, is of sufficient mass and of sufficient cohesive strength to be physically removed from the litter box for ultimate disposal. Liquid animal dross, such as urine, vomit or blood, contacts the absorbent, extruded smectite clay-based composition 16, causing the wetted clay to agglomerate into a soiled solid mass 20 of sufficient size and unexpectedly high cohesive strength to allow physical removal of essentially the entire soiled solid mass 20 from the remaining unsoiled absorbent composition 16. The remaining unsoiled absorbent composition 16 does not contribute to the generation of noxious odors and can remain in the litter box 10 for future use. Soiled solid mass 20 is discarded in an appropriate manner without the need of cleaning the entire litter box 10 and discarding its entire contents.

Extruded smectite clays useful in accordance with the principles of the present invention have sodium or calcium, preferably sodium, as the predominant exchangeable cation, although these clays often include a variety of other exchangeable cations in a smaller amount. One or more additional smectite clays, containing predominantly other exchangeable cations, can be added as well, so long as the extruded smectite, in the preferred embodiment, comprises at least about 50%, preferably about 65% to about 100%, by weight sodium or calcium bentonite, preferably sodium bentonite, based on the total dry weight of smectite clays in the absorbent composition. Instead of at least 50% by weight sodium bentonite, the composition can comprise at least about 50% by weight calcium bentonite or fuller's earth. Other bentonite clay additives, in amounts of about 1% to about 49% can be added to the extruded sodium and/or calcium bentonite clay. Examples of additional clay additives includes Beidellite, Nontronite, Hectorite and Saponite; or combinations thereof. The extruded smectite clay-based compositions of the present invention also can include Attapulgite or Sepiolite additives in amounts of about 1% to about 25% based on the total weight of extruded smectite clay in the composition.

The litter box absorbent composition also can include other typically used litter box absorbents such as other clays, sand, or cellulose-based absorbent materials. However, any optionally added ingredient cannot be present in an amount that materially and adversely affects the ability of the extruded smectite clay to absorb liquid dross products and simultaneously agglomerate into a monolithic mass of sufficient size and cohesive strength for essentially complete physical removal of the soiled and wetted mass from the litter box. Any optional ingredients and additional absorbents are dry-blended into the extruded smectite clay absorbent composition of the present invention. In the preferred embodiment, the extruded smectite clay is present in an amount of at least about 50%, more preferably at least about 65% by weight of the absorbent composition. To achieve the full advantage of the present invention, the composition should include extruded sodium bentonite clay in an amount of at least about 90% by weight of the composition.

It should be noted that the animal dross absorbent composition of the present invention can be used in litter boxes or in cages of animals including, among others, household pets such as cats, dogs, gerbils, guinea pigs, mice and hamsters; other pets such as rabbits, ferrets and skunks; or laboratory animals such as monkeys, mice, rats, goats, horses, cows and sheep. The animal litter absorbent composition of the present invention is especially useful for smaller animals, such as cats. Furthermore, the extruded smectite clay-based composition of the present invention is suitable for other uses in addition to absorbing urine, such as absorbing vomit or absorbing waste liquids in appropriate areas of slaughter houses and meat packing plants.

EXTRUSION (FIG. 2)

When extruded with a rotating wiper blade, scraping blade, or cutter, the finely divided extruded smectite bentonite clay of the present invention provides greatly increased clump strength as compared to the same smectite material without extrusion, particularly without a wiper, scraper or cutting blade adjacent to the entrance to the die opening. Sodium and calcium bentonite are composed of layers, sheets or platelets (crystals) with the exchangeable cation occurring between the layers. The layers (crystals) are randomly oriented in crude clay particles. Extrusion, such as disclosed in the Simons patent 2,231,328, has been used to rupture the structure of the clay particle, while the clay particles are moist, by subjecting the particles to shear forces sufficient to break the clay particles along various randomly oriented shear planes corresponding to the flat plate surfaces of the bentonite particles.

While simple extrusion provides sufficient shear to separate the clay platelets enough to improve the clump strength, by rotating a wiper, scraper or cutter blade adjacent the structure surrounding the entrance of a die opening during extrusion, the clumping characteristics are substantially improved over simple extrusion. A rotating blade adjacent to the die opening entrance substantially completely aligns the flat plates of the clay structure in parallel relationship perpendicular to the axis of the rotating cutting blade. Apparently, it is this alignment that separates flat clay plates from each other that produces the unexpected increase in clump strength discovered in accordance with the present invention.

The smectite clay thus extruded, and cut or wiped in accordance with a preferred embodiment of the present invention, exits from the die opening in pellet form having the flat plates of the clay structure aligned perpendicular to the longitudinal axis of the pellet. The pellets break off from an exit end of the die opening when the pellet increases in length sufficiently to provide enough weight that the pellet breaks at the die opening exit. Thus, the wiper, scraper or cutting blade does not have the effect of chopping the clay into distinct pellet size but operates to align and separate the flat plates of the clay structure.

The extrusion of the smectite clay in accordance with the present invention is conveniently carried out by using either a pug mill or auger extruder. Pug mills have been commonly used in the production of bricks and other ceramic materials. In general, conventional pug mills include a tubular housing having one end open for receiving clay materials and the other end closed with a flat wall including one or more die openings for extruding the clay material therethrough. Pug mills useful in accordance with the preferred embodiment of the present invention are further provided with a longitudinal axis having one or more blades disposed radially thereon. In operation, the central axis is rotated to provide shearing forces to the material within the pug mill. The blades are inclined to a slight degree so that as they turn, they force the clay material forward, toward the exit or extruding end. In this way, shear pressure forces are applied to the smectite clay material within the pug mill. The amount or intensity of shearing forces imparted by the extrusion and wiping blade, in accordance with the present invention, readily may be varied by changing the feed rate of smectite clay, blade size and/or blade angle, or the size of the extruding or die opening. Also, the rotation speed of the central axis driving the mixing or auger blades and speed of the wiping blade may be varied to change shear forces. The particular operating conditions and pug mill dimensions may be varied widely.

Application of shear pressure forces also conveniently may be applied utilizing a conventional auger extruder. Auger extruders are similar to pug mills except that the central rotating axis has a single or double screw type mixing blade which, when rotated in the appropriate direction, mixes and conveys the smectite clay toward and then through one or more die openings at the extruding end of the extruder housing. As with the pug mill, the particular dimensions, including the extruder port or die hole size and shape and/or wiper design and operating conditions may be varied widely to provide the smectite clay with differing degrees of clay platelet alignment and separation.

The most conventional way to regulate the degree of clay platelet alignment on the smectite clay is to change the size of the exit or extruder port and frequency of rotation of the wiper or cutting blades. By varying the amount or flow rate of smectite clay flowing through the extruder port, the number or frequency of cutting blade passes through the smectite clay per unit pellet length, the degree of clay platelet alignment can be regulated to desired levels.

Generally, the moisture of the clay should be in the range of about 20% to about 45% based on the dry weight of the smectite clay when the clay is extruded. The extrusion is more efficacious when done on rehydrated smectite clay rather than crude undried clay. If the clay is too dry, it would be forced through the die openings in a powdery form without sufficient platelet alignment and, therefore, insufficient improvement in clump strength. If too wet when extruded, the clay becomes very sticky and may very well clog the extruder. In one embodiment, the bentonite clay is sheared at the die opening 4,000 to 10,000 times per minute.

Figure 2:
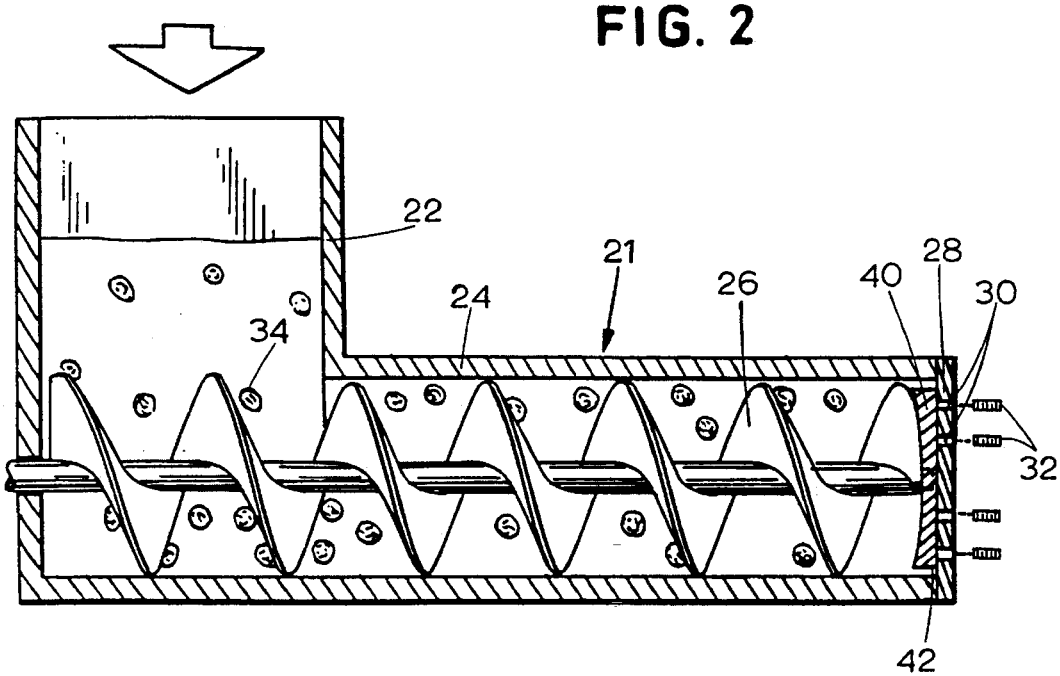
FIG. 2 is a cross-sectional view of extrusion apparatus used to extrude smectite clay in accordance with the present invention.

Referring now to FIG. 2, there is illustrated extrusion and cutting or wiping apparatus generally designated by reference numeral 21. The extrusion/cutting apparatus 21 generally includes a hopper 22 for maintaining a level of moist (i.e., 20–45% by weight water) smectite clay, an elongated extrusion barrel 24 having a rotatable auger 26 disposed therein, and a die or extrusion plate 28 disposed at one extreme end of the extrusion barrel 24, including one or more die openings 30 for extruding aligned smectite clay pellets 32 therethrough. Clay particles 34 include a plurality of flat platelets randomly aligned throughout the clay mass 34.

In the preferred embodiment, a wiper blade 40 is disposed in contact with an interior surface 42 of the die plate 28 to cut, dissaggregate, and orient the clay platelets, to provide a clay pellet having a majority of oriented clay platelets. The wiper blade 40 may be a single blade or can include a number of blade arms each having a tapered blade portion disposed in wiping or cutting contact against the interior surface 42 of die plate 28.

As shown in FIG. 2, the wiper blade 40 can be an integral part of the auger 26 or structurally connected thereto so that the wiping blade 40 rotates at the same speed as the auger 26. As an example, the auger 26 and wiping blade 40 having four blade arms are rotated at 1750 r.p.m. to provide excellent clay platelet orientation and separation to substantially increase clump strength. The particular speed of the wiping blade may be varied while achieving sufficient platelet alignment for unexpected improvement in clump strength.

ADHESIVES

The preferred water-soluble adhesive for use in the preferred embodiment of the present invention is a water-soluble polysaccharide, particularly a water-soluble cellulosic ether adhesive, such as carboxymethyl cellulose; methyl cellulose; hydroxypropyl cellulose; hydroxypropylmethyl cellulose; hydroxybutylmethyl cellulose; or mixtures thereof. The best clumping strength has been achieved using a small percentage of about 0.025% to less than about 0.1% by weight carboxymethyl cellulose. Other useful water-soluble adhesives include alignates and starches, such as wheat paste (a pregelatinized starch); gums, such as xanthan gum, guar gum; water-soluble polymers, such as polyvinyl pyrrolidone, polyvinyl alcohol, and those water-soluble polymers disclosed in this Assignee's U.S. Pat. No. 5,267,532, hereby incorporated by reference.

The adhesive is dry mixed with the extruded smectite clay, preferably after extrusion and grinding of the extruded clay to a desired size, e.g., powder or particulate. In accordance with the preferred embodiment, water is sprayed into the mixture of smectite clay and dry powdered or particulate adhesive to partially solubilize the adhesive during mixing, to achieve absorption of adhesive solution on the outer surfaces of the smectite clay particles. Sufficient water is in the range of about 5% to about 35%, preferably about 10% to about 20%, based on the dry weight of the smectite clay. A good size range for the powdered adhesive and for the powdered smectite clay to achieve homogeneous admixture is in the range of about 10 µm to about 200 µm, preferably less than 100 µm, e.g., 200 mesh, U.S. Sieve Series. A typical and preferred size for a particulate litter material is in the range of (a) about 50 µm to about 3350 µm or (b) about 600 µm to about 3350 µm, as disclosed in this Assignee's U.S. Pat. No. 5,000,115 (Reissued as U.S. Pat. No. Re. 33 983) and U.S. Pat. No. 5,129,365. The particle size of the absorbent material is not critical, particularly when an adhesive is mixed into the extruded smectite particles. Particles up to about 5000 µm will provide strong, coherent clumps when an adhesive in an amount of about 0.025% to about 5%, based on the dry weight of clay, is added to the composition.

To demonstrate the new and unexpected clump strength achieved in accordance with the present invention, 15 ml of a 1% by weight saline solution was added to various smectite clays, with and without first extruding the clay, and with and without the addition of various amounts of particular water-soluble adhesives. In the following Tables 1–5, each clump was formed by the dropwise addition of 15 mls of a 1% by weight NaCl solution. The wetted litters were allowed to air dry at room temperature for 24 hours. At that time, the clumps were removed with a cat litter scoop and weighed. The clumps then were placed on a #4 standard, U.S. Sieve Series mounted on a shaker table. The shaker then was operated at 450 r.p.m. for five minutes (strength test). The remaining clumps then were weighed and the percent loss of weight, as a result of the strength test, was calculated. All samples were tested in triplicate and averaged. In the following Table 1, the term "Clay", in all instances, identifies a calcined calcium bentonite, non-clumping material that has not been extruded. As shown in Sample 1, no clump was formed by wetting this "Clay".

TABLE 1

ADDITIVES TO CALCINED CLAY FOR CLUMPING CAT LITTER

| Sample Number | Sample Description | After 24 hrs. (g) | After strength test (g) | Difference (g) | % Loss |
|---|---|---|---|---|---|
| 1 | Clay Only[1] (Fuller's Earth) | 0 | — | — | — |
| 2 | Clay with 0.25% CMC | 21.15 | 0.53 | 20.62 | 97 |
| 3 | Clay with 0.5% CMC | 28.75 | 14.21 | 14.54 | 50 |
| 4 | Clay with 1% CMC | 29.89 | 18.02 | 11.87 | 40 |
| 5 | Clay with 2% CMC | 29.51 | 24.83 | 4.68 | 16 |
| 6 | Clay with 3% CMC | 36.78 | 27.55 | 9.23 | 25 |
| 7 | Clay with 0.25% Guar Gum | 24.43 | 0 | 24.43 | 100 |
| 8 | Clay with 0.5% Guar Gum | 28.04 | 8.28 | 19.76 | 76 |
| 9 | Clay with 1% Guar Gum | 29.93 | 15.42 | 14.51 | 48 |
| 10 | Clay with 2% Guar Gum | 26.30 | 21.36 | 4.94 | 19 |
| 11 | Clay with 3% Guar Gum | 25.40 | 20.87 | 4.53 | 18 |
| 12 | Clay with 0.25% Wheat Starch | 34.58 | 0 | 34.58 | 100 |
| 13 | Clay with 0.5% Wheat Starch | 35.06 | 0.57 | 34.49 | 98 |
| 14 | Clay with 1% Wheat Starch | 35.67 | 4.75 | 30.92 | 87 |
| 15 | Clay with 2% Wheat Starch | 32.01 | 15.45 | 16.56 | 52 |
| 16 | Clay with 3% Wheat Starch | 33.12 | 20.67 | 12.45 | 37 |
| 17 | Clay with 0.5% PVA | 0 | — | — | — |
| 18 | Clay with 1% PVA | 0 | — | — | — |
| 19 | Clay with 2% PVA | 4.66 | 0 | 4.66 | 100 |
| 20 | Clay with 3% PVA | 14.33 | 0 | 14.33 | 100 |
| 21 | Clay with 0.5% C.R. Clay[2] | 7.42 | 0 | 7.42 | 100 |
| 22 | Clay with 1% C.R. Clay | 21.71 | 0.15 | 21.56 | 99 |
| 23 | Clay with 2% C.R. Clay | 27.36 | 0 | 27.36 | 100 |
| 24 | Clay with 3% C.R. Clay | 25.50 | 0 | 25.50 | 100 |
| 25 | Clay with 0.5% C.R. Clay/CMC | 26.09 | 6.10 | 19.99 | 76 |
| 26 | Clay with 1% C.R. Clay/CMC | 30.70 | 5.15 | 25.55 | 83 |
| 27 | Clay with 2% C.R. Clay/CMC | 30.30 | 16.59 | 13.71 | 45 |
| 28 | Clay with 3% C.R. Clay/CMC | 26.59 | 14.21 | 12.38 | 46 |
| 29 | Clay with 0.5% C.R. Clay/Guar Gum | 30.24 | 1.98 | 28.26 | 93 |
| 30 | Clay with 1% C.R. Clay/Guar Gum | 30.42 | 6.62 | 23.80 | 78 |
| 31 | Clay with 2% C.R. Clay/Guar Gum | 27.36 | 18.78 | 8.58 | 31 |
| 32 | Clay with 3% C.R. Clay/Guar Gum | 25.80 | 19.98 | 5.82 | 23 |
| 33 | Clay with 0.5% Natural Select ™[3] | 0 | — | — | — |
| 34 | Clay with 1% Natural Select ™ | 5.09 | 0 | 5.09 | 100 |
| 35 | Clay with 2% Natural Select ™ | 5.90 | 0 | 5.90 | 100 |

TABLE 1-continued

ADDITIVES TO CALCINED CLAY FOR CLUMPING CAT LITTER

| Sample Number | Sample Description | After 24 hrs. (g) | After strength test (g) | Difference (g) | % Loss |
|---|---|---|---|---|---|
| 36 | Clay with 3% Natural Select ™ | 5.21 | 0 | 5.21 | 100 |
| 37 | Clay with 0.5% CMC/Natural Select ™ | 21.53 | 1.52 | 20.01 | 93 |
| 38 | Clay with 1% CMC/Natural Select ™ | 29.89 | 13.03 | 16.86 | 56 |
| 39 | Clay with 2% CMC/Natural Select ™ | 28.47 | 16.20 | 12.27 | 43 |
| 40 | Clay with 3% CMC/Natural Select ™ | 30.13 | 22.44 | 7.69 | 26 |
| 41 | Clay with 0.5% Guar Gum/Natural Select ™ | 31.01 | 6.41 | 24.60 | 79 |
| 42 | Clay with 1% Guar Gum/Natural Select ™ | 31.81 | 5.48 | 26.33 | 83 |
| 43 | Clay with 2% Guar Gum/Natural Select ™ | 27.37 | 18.14 | 9.23 | 34 |
| 44 | Clay with 3% Guar Gum/Natural Select ™ | 27.36 | 18.47 | 8.88 | 32 |
| 45 | Clay with 0.5% Wheat Starch/Natural Select ™ | 37.01 | 0.74 | 36.27 | 98 |
| 46 | Clay with 1% Wheat Starch/Natural Select ™ | 37.66 | 1.79 | 35.87 | 95 |
| 47 | Clay with 2% Wheat Starch/Natural Select ™ | 37.02 | 5.53 | 31.49 | 85 |
| 48 | Clay with 3% Wheat Starch/Natural Select ™ | 35.00 | 23.30 | 11.70 | 33 |

[1] A non-clumping calcium bentonite
[2] C.R. Clay - a polymer treated Na bentonite
[3] A sodium bentonite clumping cat litter brand of this Assignee having a particle size of about 50 μm to about 3350 μm In the following Table 2, two different sodium bentonites (Lovell CL-1 and Natural Select™) were tested with and without various amounts of particular water-soluble adhesives, but without first extruding the sodium bentonite clay samples. The particle size distribution for Lovell CL-1 and Natural Select™ were as follows:

| U.S. Sieve Series | CL-1 % by wt. retained | Natural Select ™ |
|---|---|---|
| 14 | 0.92 | 0.1 |
| 30 | 68.06 | 84.5 |
| 40 | 24.56 | 13.3 |
| 50 | 4.98 | 1.6 |
| 70 | 1.0 | 0.2 |

In Table 2, Samples 51–56 and 64–78 were prepared by dry mixing powdered carboxymethyl cellulose (CMC) adhesive with the sodium bentonite particles. Samples 57–61 were prepared by premixing the clay particles and adhesive particles and, while the mixture was rotating in a drum, spraying about 10% water, based on the dry weight of the clay, onto the mixture. Samples 62 and 63 were prepared by placing the clay in a rotating drum and then spraying the clay with a solution containing the adhesive dissolved or predispersed within it. The total water added was again about 10% by weight, based on the dry weight of the clay.

TABLE 2

ADDITIVES TO NATURAL SELECT ™ CAT LITTER

| Sample Number | Sample Description | After 24 hrs. (g) | After strength test (g) | Difference (g) | % Loss |
|---|---|---|---|---|---|
| 49 | Lovell CL-1 | 32.15 | 29.03 | 3.12 | 9.7 |
| 50 | Natural Select ™ Only | 25.56 | 10.57 | 14.99 | 58 |
| 51 | Natural Select ™ with 0.25% CMC | 23.0 | 12.83 | 10.17 | 44.3 |
| 52 | Natural Select ™ with 0.5% CMC | 23.55 | 13.78 | 9.77 | 41.5 |
| 53 | Natural Select ™ with 0.25% Guar Gum | 24.06 | 12.85 | 11.21 | 46.6 |
| 54 | Natural Select ™ with 0.5% Guar Gum | 23.96 | 15.69 | 8.27 | 34.5 |
| 55 | Natural Select ™ with 0.25% Wheat Starch | 27.20 | 14.0 | 13.2 | 48.5 |
| 56 | Natural Select ™ with 0.5% Wheat Starch | 25.30 | 17.15 | 8.15 | 32.2 |
| 57 | Natural Select ™ with 0.25% CMC | 25.30 | 21.62 | 3.68 | 14.5 |
| 58 | Natural Select ™ with 0.5% CMC | 26.16 | 23.07 | 3.09 | 11 |
| 59 | Natural Select ™ with 0.25% Guar Gum | 25.18 | 18.72 | 6.46 | 26 |
| 60 | Natural Select ™ with 0.5% Guar Gum | 26.08 | 21.10 | 4.98 | 19 |
| 61 | Natural Select ™ with 0.5% Wheat Starch | 27.48 | 18.38 | 9.10 | 33 |
| 62 | Natural Select ™ with 0.25% CMC (in water) | 25.97 | 17.65 | 8.32 | 32 |
| 63 | Natural Select ™ with 0.25% Guar Gum (in water) | 25.75 | 13.90 | 11.85 | 46 |
| 64 | Natural Select ™ with 0.25% CMC | 23.0 | 12.83 | 10.17 | 44.3 |
| 65 | Natural Select ™ with 0.5% CMC | 23.55 | 13.78 | 9.77 | 41.5 |
| 66 | Natural Select ™ with 1% CMC | 23.83 | 17.90 | 5.93 | 24.9 |
| 67 | Natural Select ™ with 2% CMC | 23.23 | 16.87 | 6.96 | 29.4 |
| 68 | Natural Select ™ with 3% CMC | 22.46 | 18.96 | 3.5 | 15.6 |
| 69 | Natural Select ™ with 0.25% Guar Gum | 24.06 | 12.85 | 11.21 | 46.6 |
| 70 | Natural Select ™ with 0.5% Guar Gum | 23.96 | 15.69 | 8.27 | 34.5 |
| 71 | Natural Select ™ with 1% Guar Gum | 27.41 | 18.52 | 8.89 | 32.4 |
| 72 | Natural Select ™ with 2% Guar Gum | 25.9 | 18.67 | 7.23 | 27.9 |
| 73 | Natural Select ™ with 3% Guar Gum | 26.08 | 20.21 | 5.89 | 22.5 |

TABLE 2-continued

ADDITIVES TO NATURAL SELECT ™ CAT LITTER

| Sample Number | Sample Description | After 24 hrs. (g) | After strength test (g) | Difference (g) | % Loss |
|---|---|---|---|---|---|
| 74 | Natural Select ™ with 0.25% Wheat Starch | 27.20 | 14.0 | 13.2 | 48.5 |
| 75 | Natural Select ™ with 0.5% Wheat Starch | 25.30 | 17.15 | 8.15 | 32.2 |
| 76 | Natural Select ™ with 1% Wheat Starch | 25.87 | 16.76 | 9.11 | 35.2 |
| 77 | Natural Select ™ with 2% Wheat Starch | 26.23 | 17.53 | 8.7 | 33.2 |
| 78 | Natural Select ™ with 3% Wheat Starch | 25.72 | 16.40 | 9.32 | 36.2 |

Table 3 shows a direct comparison of two different granular sodium bentonite clays having a particle size in the range of about 50 μm to about 3350 μm (one from Upton, Wyo., and the other Natural Select™). The extruded samples were ground to a particle size of less than 200 mesh and wetted to contain about 25% H$_2$O prior to extrusion, without any adhesive additives.

TABLE 3

COMPARISON OF EXTRUDED CLAY VERSUS STANDARD CAT LITTER

| Sample Number | Sample Description | After 24 hrs. (grams) | After strength test (grams) | Difference (grams) | % Loss |
|---|---|---|---|---|---|
| 79 | Upton | 30.33 | 23.34 | 6.99 | 23 |
| 80 | Extruded Upton | 37.16 | 32.94 | 4.22 | 11 |
| 81 | Natural Select ™ | 25.77 | 16.11 | 9.66 | 37.5 |
| 82 | Extruded Natural Select ™ | 36.70 | 30.70 | 6.0 | 16 |

In addition to having better clumpability (initially higher weight), the clumps formed with extruded sodium bentonite were found to be stronger than the clumps formed in the non-extruded sodium bentonite.

The following Table 4 is similar to Table 3, but the crude sodium bentonite clay was not dried or ground prior to extrusion. The sodium bentonite crude clay had a moisture content of about 25% by weight, based on the dry weight of the clay, when extruded.

TABLE 4

EXTRUSION OF CRUDE COLONY CLAY

| Sample Number | Sample Description | After 24 hrs. (grams) | After strength test (grams) | % Loss |
|---|---|---|---|---|
| 83 | Extruded Only | 30.16 | 26.10 | 13.4 |
| 84 | Extruded Only | 30.37 | 26.82 | 11.7 |

In Table 5, extrusion and the addition of CMC or guar gum or wheat starch were combined. Samples 87 and 88 were processed by extruding crude sodium bentonite clay, having a moisture content of about 30% by weight. Samples 85, 86, and 89–94 were processed by grinding the crude sodium bentonite clay to a particle size less than 200 mesh and then rehydrating the clay to a moisture content of about 30% by weight prior to extrusion. Very surprisingly, the clump strength improved radically at doses below the 0.1% adhesive level that was ineffective in the prior art. Further, it was found that the extrusion and addition of 0.05% CMC (Samples 89 and 90) to rehydrated powders (e.g., less than 150 mesh) gave substantially stronger clumps than the use of crude extruded clay. Substantial improvements in clump strength were also found for low level addition of guar gum and wheat starch as the adhesive (Samples 91–94).

TABLE 5

ADDITIVES TO EXTRUDED NATURAL SELECT ™

| Sample Number | Sample Description | After 24 hrs. (grams) | After strength test (grams) | % Loss |
|---|---|---|---|---|
| 85 | With 0.1% CMC | 33.92 | 31.63 | 6.7 |
| 86 | With 0.1% CMC | 39.89 | 36.40 | 8.7 |
| 87 | Extruded Crude with 0.1% CMC | 37.20 | 30.69 | 17.5 |
| 88 | Extruded Crude with 0.1% CMC | 39.20 | 33.66 | 14.1 |
| 89 | With 0.05% CMC | 32.77 | 29.53 | 9.8 |
| 90 | With 0.05% CMC | 34.27 | 31.29 | 8.7 |
| 91 | 0.05% Guar Gum | 36.66 | 32.49 | 11.3 |
| 92 | 0.05% Guar Gum* | 32.77 | 31.45 | 4.0 |
| 93 | 0.05% Wheat Starch | 34.02 | 29.94 | 12.1 |
| 94 | 0.05% Wheat Starch* | 32.50 | 30.08 | 7.3 |

Clump solution was 1% NaCl
*Clumps were weighed about 6 hours and shaken for 15 seconds; clump solution was 50/50 mix of 0.5M NH$_4$Cl and 1% NaCl Many modifications and variations of the invention as hereinbefore set forth can be made without departing from the spirit and scope thereof and therefore only such limitations should be imposed as are indicated by the appended claims.

What is claimed is:

1. A litter box comprising a water-impermeable receptacle having disposed therein an absorbent composition capable of agglomerating upon wetting into a mass of sufficient size and of sufficient cohesive strength for physical removal of the agglomerated mass from the litter box without substantial adherence to an animal, said absorbent composition comprising extruded particles of a smectite clay.

2. The litter box of claim 1, wherein the smectite clay is selected from the group consisting of sodium bentonite, calcium bentonite, and combinations thereof.

3. The litter box of claim 2, wherein the extruded smectite clay is sodium bentonite, and the absorbent composition comprises at least about 50% of said extruded sodium bentonite clay.

4. The litter box of claim 3, wherein the extruded sodium bentonite clay comprises at least about 65% by weight of the absorbent composition.

5. The litter box of claim 4, wherein the extruded sodium bentonite clay comprises at least about 90% by weight of the absorbent composition.

6. A litter box comprising a water-impermeable receptacle having disposed therein an absorbent composition capable of agglomerating upon wetting into a mass of sufficient size and of sufficient cohesive strength for physical removal of the agglomerated mass from the litter box without substantial adherence to an animal, said absorbent composition comprising extruded particles of sodium bentonite clay, and a dry-mixed water-soluble adhesive in an amount of about 0.025% to about 5.0%, based on the dry weight of extruded sodium bentonite clay in the absorbent composition, said extruded sodium bentonite clay comprising at least about 50% by weight of said absorbent composition.

7. The litter box of claim 6, wherein the water-soluble adhesive is included in the absorbent composition in an amount of about 0.025% to less than 0.1%, based on the dry weight of the extruded sodium bentonite clay in the composition.

8. The litter box of claim 6, wherein the water-soluble adhesive is selected from the group consisting of a gum, a cellulosic ether, an alginate, a starch, and mixtures thereof.

9. The litter box of claim 8, wherein the adhesive is a cellulosic ether.

10. The litter box of claim 9, wherein the cellulosic ether is selected from the group consisting of carboxymethyl cellulose; methyl cellulose; hydroxypropylmethyl cellulose; hydroxypropyl cellulose; hydroxybutylmethyl cellulose; and mixtures thereof.

11. The litter box of claim 6, wherein the extruded sodium bentonite clay comprises at least about 65% by weight of the absorbent composition.

12. The litter box of claim 11, wherein the extruded sodium bentonite clay comprises at least about 90% by weight of the absorbent composition.

13. A litter box comprising a water-impermeable receptacle having disposed therein an absorbent composition capable of agglomerating upon wetting into a mass of sufficient size and of sufficient cohesive strength for physical removal of the agglomerated mass from the litter box without substantial adherence to an animal, said absorbent composition comprising extruded particles of a smectite clay selected from the group consisting of sodium bentonite, calcium bentonite, and combinations thereof, and a dry-mixed water-soluble adhesive in an amount of about 0.025% to about 5.0%, based on the dry weight of the extruded smectite clay in the absorbent composition, said extruded smectite clay comprising at least about 50% by weight of said absorbent composition.

14. The litter box of claim 13, wherein the extruded smectite clay comprises at least about 65% by weight of the absorbent composition.

15. The litter box of claim 14, wherein the extruded smectite clay comprises at least about 90% by weight of the absorbent composition.

16. The litter box of claim 13, wherein the water-soluble adhesive is included in the absorbent composition in an amount of about 0.025% to less than 0.1%, based on the dry weight of the extruded smectite clay in the composition.

17. The litter box of claim 13, wherein the water-soluble adhesive is selected from the group consisting of the gum, a cellulosic ether, and alignate, a starch, and mixtures thereof.

18. The litter box of claim 17, wherein the adhesive is cellulosic ether.

19. The litter box of claim 18, wherein the cellulosic ether is selected from the group consisting of carboxymethyl cellulose; methyl cellulose; hydroxypropylmethyl cellulose; hydroxypropyl cellulose; hydroxybutylmethyl cellulose; and mixtures thereof.

* * * * *

UNITED STATES PATENT AND TRADEMARK OFFICE
CERTIFICATE OF CORRECTION

PATENT NO.    : 5,577,463
DATED         : November 26, 1996
INVENTOR(S)   : Elazier-Davis et al.

It is certified that error appears in the above-identified patent and that said Letters Patent is hereby corrected as shown below:

Column 10, Table 1,
Sample Number 8, in % Loss column, delete "76" and substitute therefor -- 70 --.

Column 16,
Line 23, delete "and alignate" and substitute therefor -- an alginate --;

Signed and Sealed this

Twenty-fifth Day of December, 2001

Attest:

JAMES E. ROGAN
Attesting Officer — Director of the United States Patent and Trademark Office